United States Patent [19]
Kinman

[11] 3,863,740
[45] Feb. 4, 1975

[54] SEAL FOR HYDRAULIC DAMPER

[75] Inventor: George Kinman, Birmingham, England

[73] Assignee: Girling Limited, Birmingham, England

[22] Filed: May 30, 1972

[21] Appl. No.: 257,520

[30] Foreign Application Priority Data
June 2, 1971  Great Britain............... 18700/71

[52] U.S. Cl. ............................................ 188/322
[51] Int. Cl............................. F16f 5/00, F16f 9/36
[58] Field of Search ....... 277/181; 220/67; 188/322, 188/315

[56] References Cited
UNITED STATES PATENTS

| | | | |
|---|---|---|---|
| 2,957,734 | 10/1960 | McLeod | 220/67 |
| 3,007,603 | 11/1961 | Krehl | 220/67 |
| 3,408,731 | 11/1968 | Mercier | 220/67 |
| 3,757,910 | 9/1973 | Palmer | 188/322 |

Primary Examiner—Harry N. Haroian
Assistant Examiner—Robert I. Smith
Attorney, Agent, or Firm—Scrivener Parker & Scrivener and Clarke

[57] ABSTRACT

A sealed closure between a cylindrical tubular member and an inserted member is effected by rolling over the projecting end of the tubular member with a roller which is moved radially with respect to the tubular member but exerts a deforming force obliquely to the axis thereof, so as to effect deformation of the inserted member and a fluid tight seal without interposition of a separate sealing ring or the like.

3 Claims, 3 Drawing Figures

PATENTED FEB 4 1975 3,863,740

SEAL FOR HYDRAULIC DAMPER

This invention relates to a method of sealing an inserted member in a cylindrical tubular member and, more particularly but not exclusively, is concerned with a method of sealing a main seal housing in the reservoir tube of a twin-tube telescopic damper.

The reservoir tube of a twin-tube damper generally comprises a cylindrical member having a longitudinally extending welded seam. An aluminium seal housing is disposed within one end of the reservoir tube and houses a seal through which extends a piston rod. To prevent fluid leaking between the seal housing and the reservoir tube an "O" ring is positioned in a recess machined in the sealing housing and bears against the reservoir tube. The end of the reservoir tube is rolled over to maintain the seal housing in position. Although this produces a satisfactory seal, we have now found a new method of sealing a housing in a cylindrical member in a manner which obviates the use of an O ring seal, and consequently obviates the need to machine a recess to receive such a seal.

In particular the invention provides a method of sealing an inserted member in a cylindrical tubular member, comprising the steps of positioning the inserted member within the tubular member with an axial end portion of the tubular member projecting beyond the inserted member, and rolling the end portion of the tubular member into deforming and sealing engagement with the periphery of the inserted member by means of a roller which is moved radially with respect to the axis of the tubular member but which applies to the tubular member a substantial deforming pressure directed obliquely to the said axis.

The invention also includes a sealed assembly formed by the method.

Preferably, the inserted member is formed of a cold deformable plastic material such as a thermo-setting dough-moulded polyester.

For a better understanding of the present invention, and to show how the same may be carried into effect, reference will now be made, by way of example, to the accompanying drawings in which.

Figure 1:
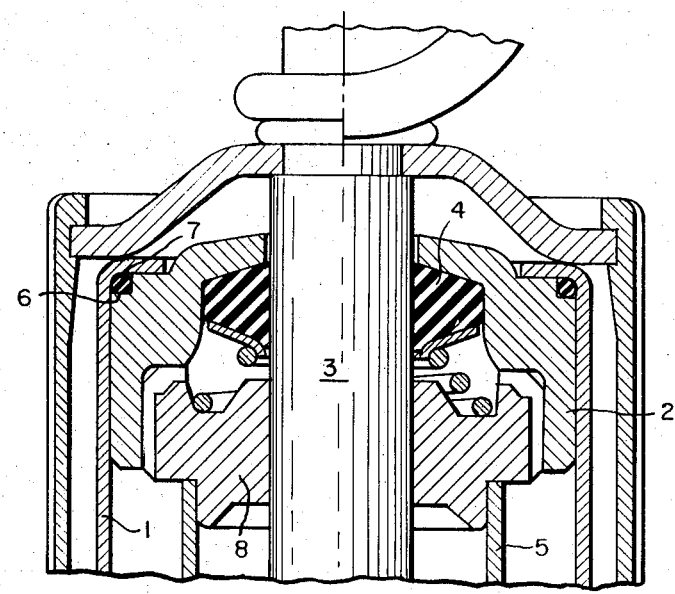
FIG. 1 shows part of a known prior art twin tube damper in axial cross-section.

Referring to FIG. 1 of the drawings, a known twin-tube damper comprises a reservoir tube 1 in one end of which is sealed an aluminium seal housing 2. A piston rod 3 extends through a rod seal 4 in the seal housing 2. A pressure tube 5 is disposed within the reservoir tube 1 and is provided with a rod guide 8 against which the aluminium seal housing 2 bears.

As shown in FIG. 1, a recess 6 is machined in the corner of the aluminium seal housing 2, and holds an O ring 7 which bears against the inside of the reservoir tube 1. The end of the reservoir tube 1 is rolled over the exposed surface of the seal housing 2 to maintain the seal housing 2 in position.

Figure 2:
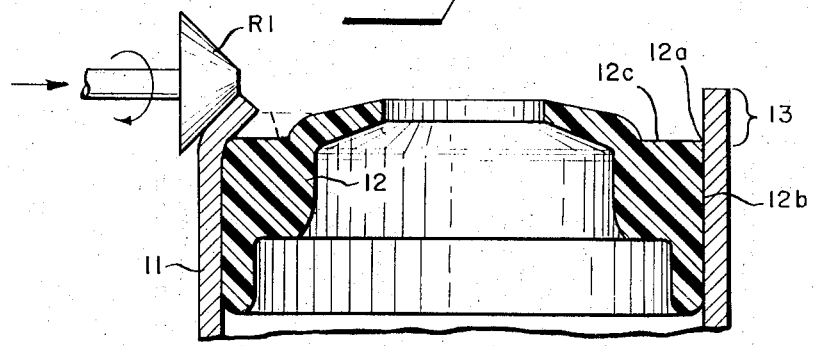
FIG. 2 is an axial cross sectional view of an improved seal housing showing the initial step of sealing the housing in position by a preferred method in accordance with the invention.
Figure 3:
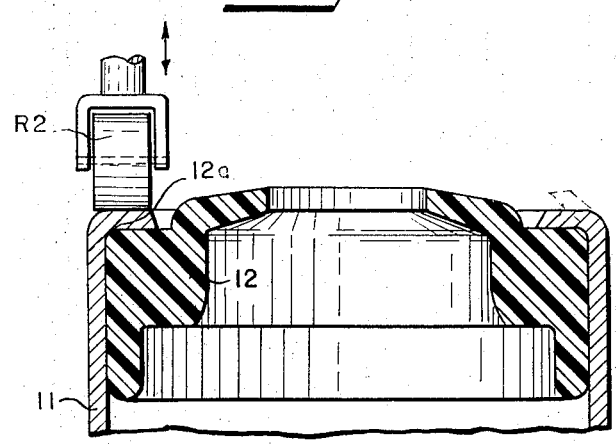
FIG. 3 is a view similar to FIG. 2, but showing the concluding step and the finished seal in accordance with the invention.

The improved seal housing 12 shown in FIGS. 2 and 3 is made of thermo-setting polyester dough moulded material and is formed without a groove for a separate sealing member. Instead, the component is provided with a sharp edged upper, outer annular corner 12a, which is approximately right angular as shown, between the cylindrical outer periphery 12b of the housing and its adjacent, outwardly directed end face 12c, and a tight seal with the reservoir tube is obtained by the subsequent rolling over of the reservoir tube end into deforming engagement with the corner.

In assembly of the parts, the housing 12 is inserted through the open outer end of the reservoir tube of permanently deformable metal and comes to rest on the rod guide (not shown in FIGS. 2 and 3) in which position the outer end portion 13 of the tube projects beyond the outer end face 12c of the housing, as shown in the right hand half of FIG. 2.

An angled roller R1 approaches radially of the reservoir tube 11 and rolls the outer end portion 13 of the reservoir tube to a 45° angle as shown in the left hand half of FIG. 2. This rolling presses the tube wall into deforming engagement with the adjacent sharp corner of the housing to form a tight seal therewith. The rolling operation is completed by an axially approaching roller R2 which rolls the extreme end 13 of the reservoir tube over the face 12c of the seal housing as shown in FIG. 3 to provide a flat abutment for the damper's bump rubber.

The thermo-setting polyester dough moulded material mentioned above is particularly suitable for the seal housing, since it is strong, and is stable both at high temperatures (180°) and at low temperatures (−40°C). It should be understood, however that other material not subject to excess "creep" would be equally suitable for seal housings, although harder materials would need greater roller pressure to produce the desired deformation.

I claim:

1. In a twin tube hydraulic damper including a cylindrical reservoir tube of permanently deformable metal the invention which comprises a rod seal housing adapted to receive a rod seal for sealing the piston rod of said damper, said housing being located in said tube and being of a cold deformable plastic material normally having an upper outer annular edge of approximately 90°, said tube having an end portion rolled over into direct engagement with said seal housing to deform said edge and maintain said edge deformed to form a liquid tight seal at said deformed edge between said tube and said housing without the interposition of a separate sealing gasket.

2. In the damper according to claim 1 wherein said plastic material is a synthetic thermosetting material.

3. In the damper as claimed in claim 2, wherein said material is a dough-moulded polyester.

* * * * *